United States Patent [19]

Kaneko

[11] 4,393,413
[45] Jul. 12, 1983

[54] VELOCITY ERROR COMPENSATOR FOR TIME BASE ERROR CORRECTIONS OF PERIODIC INFORMATION SIGNALS

[75] Inventor: Shinji Kaneko, Sagamihara, Japan
[73] Assignee: Sony Corporation, Tokyo, Japan
[21] Appl. No.: 243,855
[22] Filed: Mar. 16, 1981
[30] Foreign Application Priority Data
Mar. 18, 1980 [JP] Japan .................... 55-34615
[51] Int. Cl.³ .................. H04N 9/44; H04N 9/46; G11B 5/43; H04N 5/78
[52] U.S. Cl. .................... 358/326; 358/19; 360/26; 360/36.1
[58] Field of Search ............. 358/8, 326, 19; 360/36, 360/26, 36.1

[56] References Cited
U.S. PATENT DOCUMENTS

| | | | |
|---|---|---|---|
| 3,994,013 | 11/1976 | Lemoine et al. ............. | 360/36 X |
| 4,053,926 | 10/1977 | Lemoine et al. ............. | 360/36 X |
| 4,165,524 | 8/1979 | Ninomiya ................ | 358/8 X |
| 4,321,619 | 3/1982 | Kamath .................. | 360/36 X |

Primary Examiner—Aristotelis M. Psitos
Attorney, Agent, or Firm—Lewis H. Eslinger; Alvin Sinderbrand

[57] ABSTRACT

A velocity error compensator adapted for use in a time base corrector of the type which includes a main memory into which individual periods, such as horizontal line intervals, of information signals, such as video signals, are written at a write-in rate synchronized with the information signals, and from which the individual periods of information signals are read out at a reference read-out rate. The velocity error compensator includes a storage device for storing velocity error signals associated with corresponding ones of the periods of information signals. The velocity error signal associated with the period of information signals then read out from the main memory, and also the velocity error signals associated with the preceding and next-following periods of information signals are simultaneously read out from the storage device. These three velocity error signals are combined to produce a velocity error correction signal which is used to modulate the information signal read-out rate.

17 Claims, 9 Drawing Figures

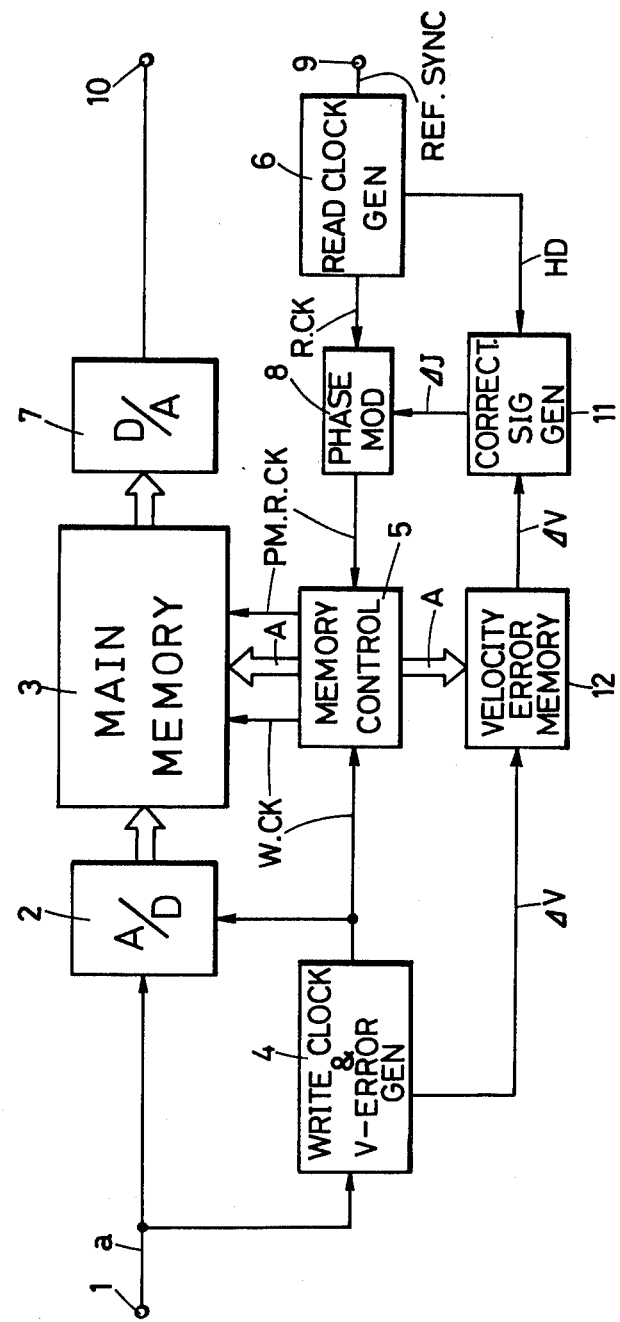
FIG. I

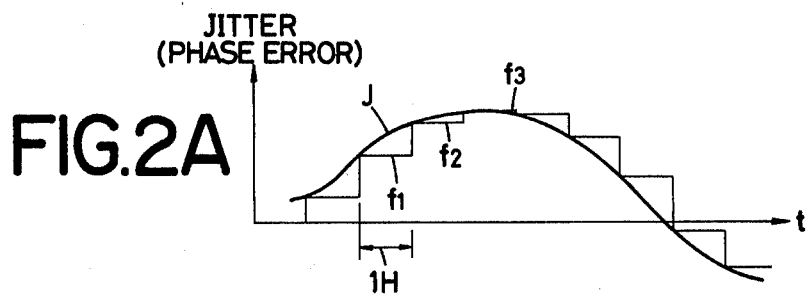
FIG.2A
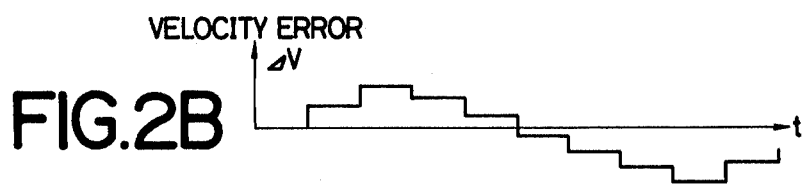
FIG.2B
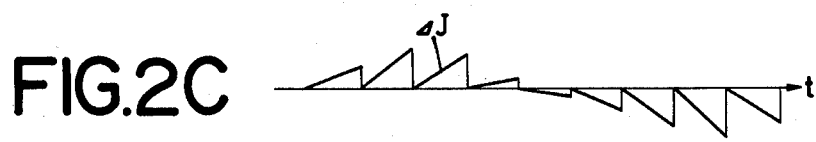
FIG.2C
FIG.3
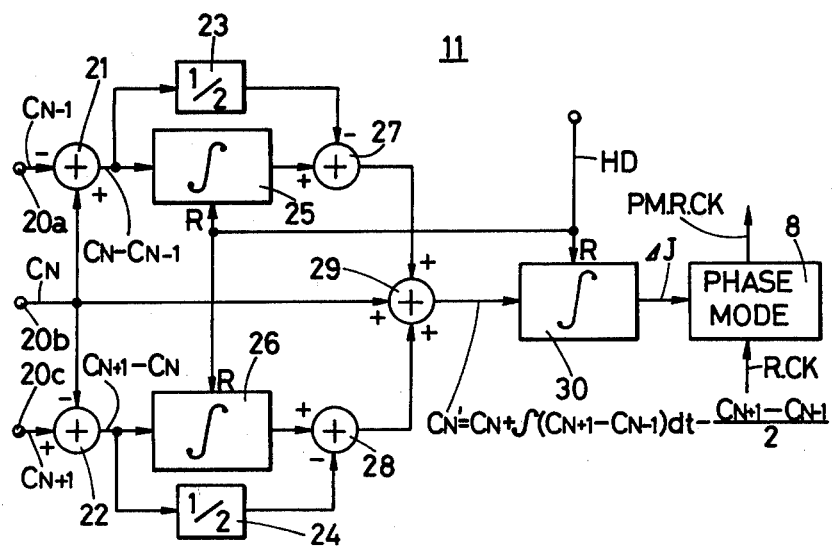

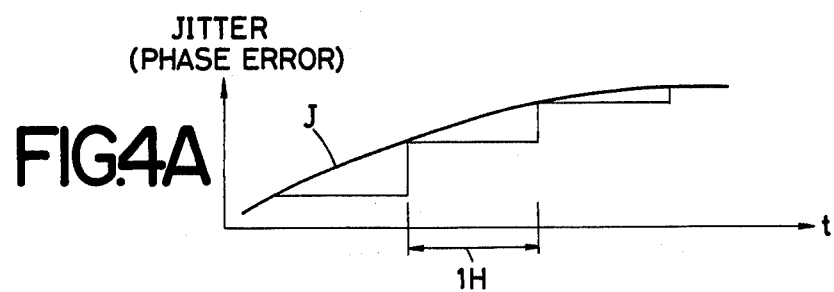

VELOCITY ERROR COMPENSATOR FOR TIME BASE ERROR CORRECTIONS OF PERIODIC INFORMATION SIGNALS

BACKGROUND OF THE INVENTION

This invention relates to a velocity error compensator that is adapted for use in a time base corrector and, more particularly, to an improved velocity error compensator which functions to more accurately compensate for actual velocity errors that may be present in the information signals which are supplied to the time base corrector.

Time base correctors are particularly useful in correcting time base, or frequency and/or phase errors which may be introduced into periodic information signals that are reproduced by a signal playback device. One advantageous application of time base correctors is to correct for such errors in video signals that are reproduced by a video tape recorder (VTR). Although there are, of course, other applications of time base correctors, in the interest of simplification, the following description is limited primarily to the use of such time base correctors in conjunction with a VTR.

Time base errors may be present in the video signals reproduced from a VTR when, for example, the record medium, such as magnetic tape, expands or contracts after the video signals have been recorded thereon. Time base errors also may be present if the speed at which the record medium is transported during a playback operation differs from its speed during the recording operation. Still further, if the rotary speed at which the head (or heads) scans the record medium during the signal playback operation differs from its rotary speed during the signal recording operation, time base errors may be introduced. These time base errors are perceived, in the video picture ultimately reproduced from the played back video signals, as jitter distortion, brightness distortion, improper color display, and the like.

Such time base errors are corrected in time base correcting apparatus, one example of which is described in U.S. Pat. No. 3,860,952. In a typical time base corrector, the reproduced video signals are converted from analog form into digital form and are temporarily stored in a main memory. The digitized video signals are written into the main memory at a write-in clock rate which varies in accordance with detected time base errors. For example, the write-in clock generator may be synchronized to the reproduced horizontal synchronizing signal and/or to the chrominance subcarrier represented by the burst signal included in a composite color video signal. Although the digitized video signals thus are synchronously written into the main memory, they are read out from that memory at a standard, or reference read-out rate. Thus, the digitized video signals read out from the main memory are substantially free of significant time base errors. The read out digitized video signals then are reconverted back into analog form.

Although significant, slowly varying time base errors are corrected by time base correctors of the foregoing type, velocity errors which may be present in the reproduced video signals generally are not taken into account. The expression "velocity error" generally refers to the error in the phase or frequency of the write-in clock with respect to the reproduced video signals over a horizontal line interval. This error may occur because the write-in clock is synchronized only at the beginning of each line interval. Synchronism generally is attained by means of a phase-locked loop that is phase-locked to the horizontal synchronizing pulse and/or to the burst signal, both of which are present only at the beginning of the line interval. Thereafter, the write-in clock remains fixed throughout the remainder of the line interval, even though the frequency and/or phase of the reproduced video signals may vary. Of course, at the beginning of the next-following line interval, the write-in clock is brought into proper synchronism with the video signals. The amount of frequency and/or phase adjustment which is needed at the beginning of the next-following line interval in order to bring the write-in clock into proper synchronism is representative of the size, or quantity, of the velocity error that was present over the just-received line interval. This velocity error, if not corrected, will be perceived as jitter in the video picture which ultimately is reproduced.

One technique for correcting velocity errors is described in U.S. Pat. No. 4,054,903, assigned to the assignee of the present invention. In this patent, velocity errors are detected by sensing the difference between the phase of the burst signal which is reproduced in two successive lines. Such detected velocity errors are represented as voltages, and the velocity error voltages associated with corresponding line intervals are stored in suitable storage devices, such as capacitors. When an individual line interval is read out from the main memory of the time base corrector, its associated velocity error voltage also is read out. This error voltage then is used to modulate the rate at which this line of video signals is read out from the main memory. Velocity error correction thus proceeds on the assumption that the velocity error which may be present in a line interval varies approximately in a uniform, or linear manner over the entire line interval. Thus, the velocity error voltage is integrated to produce a sawtooth-shaped velocity error correction signal. The phase of the read-out clock pulses is modulated with this velocity error correction signal so as to increase (or decrease) uniformly over the line interval, thereby providing an approximate correction for the velocity error.

Another technique for correcting velocity errors is described in U.S. Pat. No. 4,165,524, also assigned to the assignee of the present invention. In this patent, it is assumed that the velocity error which may be present over a line interval is not a linear function. Here, the non-linear velocity error over a particular line interval N is approximated by generating a velocity error correction signal that varies linearly with a first slope during a first quarter of the line interval, then varies linearly with a second, different slope during the next two quarters of the line interval, and then varies with a linear, still different slope over the last quarter of the line interval. The first slope is produced as a function of the velocity error associated with the Nth line interval, in combination with the velocity error of the (N−1)th line interval; the second slope is a function of the velocity error associated solely with Nth line interval; and the third slope is a function of the velocity error of the Nth line interval, in combination with the velocity error associated with the (N+1)th line interval. Although the velocity errors associated with three successive line intervals are used, in combination, to produce the resultant velocity error correction signal, a relatively complicated timing scheme is relied upon in order to read out the different velocity error signals at different times during the Nth line interval. Furthermore, while one velocity error voltage is read out from the storage device, the preceding velocity error voltage must be stored in a sample-and-hold circuit so that it can be combined therewith. Also, the velocity error associated with the Nth line interval must be read out after three-fourths of the (N−1)th line interval has been read out from the main memory.

It is desirable to approximate the non-linear velocity error which may be present in a line interval of video signals with a relatively simpler velocity error compensating circuit that does not require a complicated timing scheme and which obviates the need for additional sample-and-hold circuitry.

OBJECTS OF THE INVENTION

Accordingly, it is an object of the present invention to provide an improved velocity error compensator for use in a time base corrector.

Another object of this invention is to provide an improved velocity error compensator which produces a velocity error correction signal that is a function of the velocity error signals which are associated with the line interval of video signals then read out from the main memory of the time base corrector, together with the velocity error signals which are associated with the preceding and next-following line intervals.

A further object of this invention is to provide a velocity error compensator which includes a storage device for storing the velocity error signals associated with successive horizontal line intervals of video signals, from which the velocity error signals associated with three successive line intervals are simultaneously read out and combined to produce an accurate velocity error correction signal.

An additional object of this invention is to provide a velocity error compensator for use with a video signal time base corrector wherein, when a particular line of video signals is read out from the main memory of the time base corrector, a gradient signal is generated representing the gradient between the velocity error signals associated with the preceding and next-following line intervals, this gradient signal being added to the velocity error signal associated with the line interval then read out, so as to produce an accurate velocity error correction signal.

Yet another object of this invention is to provide an improved velocity error compensator which is adapted for use with a time base corrector that corrects time base errors in periodic information signals.

Various other objects, advantages and features of the present invention will become readily apparent from the ensuing detailed description, and the novel features will be particularly pointed out in the appended claims.

SUMMARY OF THE INVENTION

In accordance with this invention, an improved velocity error compensator is provided for use with a time base corrector of the type which includes a main memory adapted to store successive periods of periodic information signals, such as successive line intervals of video signals, these information signals being written into the main memory at a write-in rate which may vary in synchronism with time base variations in the information signals, and which are read out therefrom at a reference read-out rate. The velocity error compensator includes a velocity error detector for detecting velocity errors in each period of the information signals, and a storage device for storing a plurality of representative velocity error signals. When a particular period of information signals is read out from the main memory, the velocity error signal associated with that period, as well as the velocity error signals associated with the preceding and next-following periods, are simultaneously read out of the storage device. The simultaneously read out velocity error signals are combined to produce a velocity error correction signal which is used to modulate the read-out rate for the main memory.

In a preferred embodiment, a gradient signal is produced to represent the gradient between the velocity error signals associated with the preceding and next-following periods of information signals, and this gradient signal is added to the velocity error signal associated with the period then read out from the main memory. These added signals then are integrated to produce the velocity error correction signal.

BRIEF DESCRIPTION OF THE DRAWINGS

The following detailed description, given by way of example, will best be understood in conjunction with the accompanying drawings in which:

FIG. 1 is a block diagram of a time base corrector in which the velocity error compensator of the present invention finds ready application;

FIGS. 2A–2C are waveform diagrams which are useful in explaining the operation of prior art velocity error compensators;

FIG. 3 is a block diagram of one embodiment of the present invention;

FIGS. 4A–4C are waveform diagrams which are useful in understanding the operation of the embodiment shown in FIG. 3; and FIG. 5 is a block diagram of another embodiment of the present invention.

DETAILED DESCRIPTION OF CERTAIN PREFERRED EMBODIMENTS

Referring now to the drawings, and in particular to FIG. 1, there is illustrated a block diagram of a time base corrector with which the present invention finds ready application. This time base corrector may be of the type described in the aforementioned patents, the disclosures of which are incorporated herein by reference. For ease of understanding, it is assumed that the illustrated time base corrector functions to correct time base errors in video signals which are reproduced from, for example, a magnetic tape, such as those video signals which are reproduced by a VTR. However, it will be fully appreciated that the time base corrector is adapted to correct time base errors in other types of periodic information signals, and in information signals which may be supplied thereto from other types of signal reproducing devices, or which may be transmitted thereto via transmission channels which are subjected to time base errors.

The time base corrector includes, generally, a main memory 3, a write clock and velocity error generator 4, a memory control circuit 5, a read clock generator 6, a phase modulator 8 and a velocity error memory 12. Main memory 3 is adapted to store a plurality of line intervals of video signals, such as, for example, eight line intervals. Color video signals a reproduced by a VTR (not shown) are supplied to an input terminal 1, and these color video signals are digitized by an analog-to-digital (A/D) converter 2, the digitized video signals being supplied to main memory 3. Write clock and velocity error generator 4 also is coupled to input terminal 1 and is adapted to separate the horizontal synchronizing signals and the burst signals included in the reproduced color video signals. These separated synchronizing and burst signals are used to generate write clock pulses having a repetition rate that is three times the chrominance subcarrier frequency $f_{sc}$. As disclosed in the aforementioned patents, the write clock generator may include a phase-locked loop having an oscillating circuit for generating the write clock pulses of frequency $3f_{sc}$, and which is phase-locked to the chrominance subcarrier of the burst signal. The generated write clock pulses WCK are supplied to A/D converter 2 as sampling pulses therefor; and these write clock pulses also are supplied to memory control circuit 5 wherein they are used to produce main memory addresses, and wherein they control the rate at which the digitized video signals are written into each addressed location of the main memory. Although not shown herein, it will be appreciated that main memory 3 includes a plurality of addressable storage locations sufficient to store the desired number of line intervals (for example, eight) of video signals. Each line interval is stored in an individual storage location. Write clock and velocity error generator 4 also is adapted to produce velocity error signals $\Delta V$ which represent the velocity error of the line interval which has just been written into the main memory. As described in the aforementioned patents, the velocity error signal $\Delta V$ may be produced by detecting the phase difference between the write clock pulses WCK and the burst signal at the beginning of a horizontal line interval just before the write clock generator is phase-synchronized with that burst signal. Hence, if a velocity error is present in a line interval, the velocity error signal $\Delta V$ produced by write clock and velocity error generator 4, which may be a voltage signal, represents the net velocity error. That is, the total amount of velocity error which occurs over the entire line interval is represented by this velocity error signal $\Delta V$.

Velocity error memory 12 is coupled to write clock and velocity error generator 4 and is adapted to receive the velocity error signal $\Delta V$ which is associated with the line interval which has just been written into the addressed storage location of main memory 3. As described in the aforementioned patents, velocity error memory 12 may comprise a plurality of storage devices, such as capacitors, each storage device being associated with a corresponding storage location of main memory 3. Hence, the address A produced by memory control circuit 5 to address the appropriate storage location in main memory 3 into which a digitized line of video signals is written also is used to address the corresponding storage device of velocity error memory 12 into which the associated velocity error signal $\Delta V$ is written, or stored.

Memory control circuit 5 also is adapted to supply read clock pulses to main memory 3 in order to read out the line of video signals which is stored in a particular storage location of the main memory then being addressed for a read-out operation. The memory control circuit is adapted to generate a read-out address which differs from the write-in address, thereby preventing a common storage location from being simultaneously addressed for a write-in and a read-out operation. The read-out addresses, also represented as address A in FIG. 1, serve to sequentially address successive storage locations of the main memory in order to read out the digitized video signals stored therein. In this regard, memory control circuit 5 is supplied with read clock pulses RCK which are generated by read clock generator 6 in response to a reference synchronizing pulse supplied thereto via a reference synchronizing input terminal 9. These read clock pulses RCK are of a constant, predetermined repetition rate so as to read out each line interval of video signals at the fixed reference read-out rate. A digital-to-analog (D/A) converter 7 is coupled to the output of main memory 3 to re-convert the digitized video signals read out from the main memory into analog form. The output of D/A converter 7 is coupled to an output terminal 10.

It will be appreciated that, in the absence of a velocity error, the illustrated time base corrector functions to supply video signals to output terminal 10 which are substantially free of time base fluctuations. That is, by writing the video signals into main memory 3 at write-in rates which are synchronized with the video signals, and by reading out such video signals at a constant, fixed rate, time base fluctuations are removed; and the video signals supplied to output terminal 10 are provided with the proper chrominance subcarrier frequency $f_{sc}$, and the proper horizontal line interval rate. However, in the event of velocity errors which may introduce undesired jitter into the video signals, such velocity errors must be compensated. As described in the aforementioned patents, velocity errors are compensated by varying the phase of the read clock pulses RCK supplied to memory control circuit 5 by read clock generator 6 in accordance with the detected velocity errors. In FIG. 1, a phase modulator 8 is interposed between read clock generator 6 and memory control circuit 5, this phase modulator being adapted to modulate the phase of the read clock pulses RCK so as to supply phase-modulated read clock pulses PMRCK to the memory control circuit. Phase modulator 8 also is supplied with a modulating, or a control signal $\Delta J$ which controls the phase modulations of the read clock pulses. Control signal $\Delta J$ is generated by a velocity error correction signal generator 11, whereby control signal $\Delta J$ is the velocity error correction signal. As illustrated in FIG. 1, velocity error correction signal generator 11 is supplied with velocity error signals $\Delta V$ read out from velocity error memory 12 and, additionally, with a reference horizontal synchronizing signal HD. This reference horizontal synchronizing signal HD is supplied thereto from read clock generator 6 and exhibits a fixed constant frequency equal to the horizontal synchronizing frequency, derived from the reference synchronizing signal supplied to reference synchronizing signal input terminal 9.

In the velocity error compensator described in U.S. Pat. No. 4,054,903, velocity error correction signal $\Delta J$ is a sawtooth waveform. In U.S. Pat. No. 4,165,524, the velocity error signal $\Delta J$ is a multi-segment approximation of a non-linear function. In both of these velocity error compensators, the phase of the read clock pulses RCK is modulated in accordance with the velocity error correction signal $\Delta J$. Such phase modulations increase (or decrease) over a horizontal line interval as the error correction signal $\Delta J$ increases (or decreases).

Let it be assumed that the reproduced color video signal a supplied to input terminal 1 exhibits a time base error of the type illustrated as jitter curve J shown in FIG. 2A. That is, the chrominance subcarrier exhibits phase and/or frequency fluctuations of the type represented by curve J. It is seen that such phase and/or frequency fluctuations, which, for the purpose of simplification, are referred to merely as "jitter," vary over a horizontal line interval (1H). As described above, and as disclosed in greater detail in the aforementioned patents, the write clock pulses WCK generated by write clock generator 4 are synchronized with the phase and frequency of the chrominance subcarrier which is present at the beginning of each horizontal line interval, that is, the write clock pulses WCK are synchronized with the burst signal at the beginning of each line. But, as is apparent from jitter curve J, the chrominance subcarrier phase and/or frequency of the reproduced color video signals varies during this line interval. But, since the write-in clock pulses WCK do not correspondingly vary during the line interval, such fluctuations in the chrominance subcarrier are not corrected, and appear as velocity errors. More particularly, the phase of the write clock pulses WCK during, for example, three successive line intervals is indicated at $f_1$, $f_2$ and $f_3$, respectively. While each of these phases remains fixed throughout its corresponding line interval, the phase of the chrominance subcarrier fluctuates during that line interval, as represented by curve J. This difference in phase between the chrominance subcarrier and the write clock pulses WCK, that is, this velocity error, if not compensated, is perceived as jitter in the ultimately reproduced video picture. As described in the aforementioned patents, and as mentioned hereinabove, such velocity errors are compensated by modulating the phase of the read clock pulses RCK such that the phase modulating signal $\Delta J$ (that is, the velocity error correction signal) approximates each segment of the jitter curve J in each horizontal line interval 1H.

The velocity error signal $\Delta V$ supplied to velocity error memory 12 by write clock and velocity error generator 4 at the end of each horizontal line interval, appears as shown in FIG. 2B. It is appreciated that this velocity error signal $\Delta V$ is a step-wise approximation of the jitter curve J, with the level of each step representing the difference between the phase of the burst signal of two adjacent line intervals. That is, each step change in the velocity error signal $\Delta V$ represents the magnitude of the overall velocity error of the just-completed line interval. For example, in FIG. 2B, the first illustrated step represents the incremental increase in the velocity error of the $(N-1)$th line interval, the next step increase represents the incremental increase in the velocity error of the Nth line interval, the next step decrease represents the incremental decrease (i.e. change in the negative direction) of the velocity error of the $(N+1)$th line interval, and so on.

A comparison between FIGS. 2A and 2B indicates that the velocity error signal $\Delta V$ represents the gradient, or slope, of a linear approximation of the jitter curve J. Since the velocity error signal $\Delta V$ represents the gradient of the phase fluctuation of the chrominance subcarrier, the velocity error correction signal $\Delta J$, which is intended to approximate each segment of the jitter curve J, is obtained by integrating the velocity error signal $\Delta V$. In U.S. Pat. No. 4,054,903, each velocity error signal $\Delta V$ that is read out of the velocity error memory is integrated by a suitable resettable integrating circuit, this integrating circuit being reset to an initial, or zero, condition at the beginning of each successive line interval. Thus, in the time base corrector shown in FIG. 1, if velocity error correction signal generator 11 is comprised of an integrator circuit, then each individual velocity error signal $\Delta V$ that is read out from velocity error memory 12 and supplied thereto is integrated to form the velocity error correction signal $\Delta J$, shown in FIG. 2C. It is seen, from FIG. 2C, that the velocity error correction signal $\Delta J$ is reset at the beginning of each line interval, and the velocity error correction signal appears as a linearly increasing ramp voltage produced in response to integrating each step level of the velocity error signal $\Delta V$. That is, each segment of the jitter curve J, shown in FIG. 2A, is approximated by a linear sawtooth voltage, shown in FIG. 2C, which is obtained merely by integrating the difference between the velocity error signals associated with successive line intervals. The error correction signal $\Delta J$, having the waveform shown in FIG. 2C, is used to modulate the phase of the read clock pulses RCK. Thus, even with the velocity error compensator described in U.S. Pat. No. 4,054,903, there is a substantial reduction in the velocity error which might otherwise be present in the video signals read out from the main memory.

However, the linear approximation of jitter curve J may not be satisfactory. In some instances, the difference between the actual, non-linear curve J and the linear approximation thereof may result in significant errors in the attempted compensation of the velocity error. Such approximation errors are minimized by the present invention, wherein the velocity error correction signal $\Delta J$ is generated as a non-linear function. That is, in accordance with the present invention, the velocity error correction signal $\Delta J$ is a closer, more accurate approximation of the actual non-linear jitter curve J.

One embodiment of the velocity error compensator in accordance with the present invention is illustrated in FIG. 3. In particular, this embodiment represents one construction of error correction signal generator 11 which may be used with the apparatus illustrated in FIG. 1. The embodiment of FIG. 3 is comprised of three input terminals 20a, 20b and 20c, difference circuits 21 and 22, integrators 25 and 26, subtracting circuits 27 and 28, summing circuit 29 and an integrator 30. Input terminals 20a, 20b and 20c are adapted to receive respective velocity error signals that are simultaneously read out from velocity error memory 12. More particularly, the velocity error signal which is associated with the line of video signals then read out from main memory 3 is supplied to input terminal 20b, the velocity error signal associated with the preceding line of video signals is supplied to input terminal 20a, and the velocity error signal associated with the next-following line of video signals is supplied to input terminal 20c. For example, if velocity error memory 12 is comprised of a plurality of capacitors, each of which functions to store the respective velocity error signal, then this velocity error memory may include a read-out circuit of the type wherein the velocity error signals associated with line intervals $(N-1)$, N and $(N+1)$ are simultaneously read out from the appropriate capacitors whenever line interval N is read out from main memory 3. Thus, whenever memory control circuit 5 supplies a read-out address A to velocity error memory 12, capacitors which are addressed by addresses $(A-1)$, A and $(A+1)$ are simultaneously read out. Consequently, when the Nth line interval of video signals is read out from main memory 3, input terminals 20a, 20b and 20c are supplied with velocity error signals $C_{N-1}$, $C_N$ and $C_{N+1}$, respectively, these velocity error signals being associated with the preceding line, the present line and the next-following line, respectively, of read-out video signals.

Difference circuit 21 is coupled to input terminals 20a and 20b, and is adapted to produce a difference signal representing the difference between the velocity error signals supplied to input terminals 20a and 20b, respectively. Similarly, difference circuit 22 is coupled to input terminals 20b and 20c and is adapted to produce a difference signal representing the difference between the velocity error signals supplied to these input terminals. The outputs of difference circuits 21 and 22 are coupled to integrators 25 and 26, respectively. Each integrator may be of conventional construction and is adapted to produce an integrated signal representing the time integral of the difference signals supplied thereto. Each integrator also includes a reset input R connected to receive the reference horizontal synchronizing pulse HD to be reset to an initial value, such as zero, in response thereto. Thus, at the beginning of each read out horizontal line interval, the output of each integrator 25 and 26 is reset to zero.

The outputs of integrators 25 and 26 are coupled to subtracting circuits 27 and 28, respectively. Each of these subtracting circuits is adapted to receive an attenuated version of the difference signal produced by a respective one of difference circuits 21 and 22. More particularly, the difference signal produced by difference circuit 21 is supplied via an attenuating circuit 23 to the other input of subtracting circuit 27. Likewise, the difference signal produced by difference circuit 22 is supplied via an attenuating circuit 24 to the other input of subtracting circuit 28. Each of these attenuating circuits is adapted to attenuate the difference signal supplied thereto by a predetermined factor. For a purpose that will soon be described, the attenuating factor is equal to one-half. Thus, each attenuator may comprise an amplifier whose gain is equal to one-half; or each attenuator may comprise a voltage divider circuit having a voltage dividing ratio of one-half. Subtracting circuit 27 serves to subtract the attenuated difference signal supplied thereto by attenuator 23 from the integrated difference signal supplied thereto by integrator 25. Likewise, subtracting circuit 28 is adapted to subtract the attenuated difference signal supplied thereto by attenuator 24 from the integrated difference signal supplied thereto by integrator 26. The outputs from subtracting circuits 27 and 28 are supplied to summing circuit 29. The velocity error signal $C_N$, supplied to input terminal 20b from velocity error memory 12 also is supplied to summing circuit 29. This summing circuit functions to sum, or algebraically add, the respective signals supplied thereto. The output of summing circuit 29 is coupled to integrator 30. This integrator may be similar to either of integrators 25 and 26 and includes a reset input R adapted to receive the reference horizontal synchronizing pulse HD. Integrator 30 thus functions to integrate the summed signals supplied thereto so as to produce the velocity error correction signal ΔJ. As illustrated in FIG. 3, this velocity error correction signal ΔJ is applied to phase modulator 8 to phase modulate the read clock pulses RCK supplied thereto by read clock generator 6. The resultant phase modulated read clock pulses PMRCK are used to read out the successive horizontal line intervals of video signals which are stored in sequentially addressed storage locations of main memory 3.

The manner in which the embodiment illustrated in FIG. 3 operates now will be described. Difference circuit 21 produces a difference signal representing the difference between the velocity error signals associated with the line of video signals then read out from the main memory and the preceding line of video signals.

Thus, difference circuit 21 produces a signal represented as $C_N - C_{N-1}$. Likewise, difference circuit 22 produces a difference signal, represented as $C_{N+1} - C_N$, which is a function of the difference between the velocity error signals associated with the next-following line of video signals and the line of video signals then read out from main memory 3. The difference signal produced by difference circuit 21 is integrated by integrator 25, and the difference signal produced by difference circuit 22 is integrated by integrator 26. These respective integrated difference signals are supplied, via subtracting circuits 27 and 28, to summing circuit 29. It will be seen that the effect of summing these integrated difference signals may be expressed as follows:

$$\int (C_N - C_{N-1})dt + \int (C_{N+1} - C_N)dt = \int (C_{N+1} - C_{N-1})dt \quad (1)$$

Thus, integrators 25 and 26, together with summing circuit 29, produce a gradient signal which represents the gradient between velocity error signals $C_{N+1}$ and $C_{N-1}$. That is, this gradient signal represents the gradient between the velocity error signals associated with the preceding and next-following lines of video signals read out from the main memory.

Subtracting circuit 27 subtracts the attenuated difference signal $(C_N - C_{N-1})/2$ from the integrated difference signal; and subtracting circuit 28 subtracts the attenuated difference signal $(C_{N+1} - C_N)/2$ from the integrated difference signal. In particular, the subtracted, attenuated difference signals supplied from subtracting circuits 27 and 28 to summing circuit 29 may be expressed as:

$$-\frac{C_N - C_{N-1}}{2} - \frac{C_{N+1} - C_N}{2} = -\frac{C_{N+1} - C_{N-1}}{2} \quad (2)$$

The result of subtracting the attenuated difference signals from the integrated difference signals is to adjust an offset in the gradient signal. This will be described in greater detail below.

Summing circuit 29 adds the velocity error signal $C_N$ to the gradient signal expressed in equation (1) and to the offset adjustment signal, expressed in equation (2), thus summing the offset-adjusted gradient signal and this velocity error signal to produce the summed signal $C'_N$, this summed signal being expressed as:

$$C'_N = C_N + \int (C_{N+1} - C_{N-1})dt - \frac{C_{N+1} - C_{N-1}}{2} \quad (3)$$

This summed signal $C'_N$ is integrated by integrator 30 to produce the velocity error correction signal ΔJ.

The manner in which the signal expressed as equation (3) functions to compensate velocity errors now will be described with reference to FIGS. 4A–4C. FIG. 4A illustrates the jitter curve J, representing phase fluctuations in the chrominance subcarrier over, for example, three successive horizontal line intervals. The jitter curve J of FIG. 4A is similar to that shown in FIG. 2A, but here is depicted with an enlarged time axis. Furthermore, in FIG. 4A, the jitter J is represented as increasing over time. As before, the velocity error voltages which are stored in velocity error memory 12 are respective incremental, step-level changes in the jitter curve from the beginning of one horizontal line interval to the beginning of the next. That is, each velocity error voltage represents the net change, or difference, in the phase fluctuation of the chrominance subcarrier over 1H line intervals. From FIG. 4A, it is seen that the slope of the jitter curve J decreases. The incremental change in the velocity error signal from one line interval to the next likewise decreases. FIG. 4B represents this gradual decrease in successive velocity error voltages, whereby $C_{N-1} > C_N > C_{N+1}$.

The gradient signal, expressed by equation (1) above, could be represented as a linearly decreasing line, having negative slope, and extending between the levels $C_{N-1}$ and $C_{N+1}$ of FIG. 4B. Such a line would be offset from the abscissa by an amount represented by the mathematical expression of equation (2). Hence, this amount must be subtracted from the gradient in order to provide proper offset thereto. Subtracting circuits 27 and 28, together with summing circuit 29, effect this offset. Then, since the Nth line interval is being read out from main memory 3, the velocity error signal $C_N$ must be added to the offset-adjusted gradient signal to provide the appropriate velocity error signal $C'_N$. This algebraic addition is provided by summing circuit 29, resulting in the signal expressed by equation (3), this signal being represented in FIG. 4B as the broken line $C'_N$. It is seen that this broken line is centered on the value $C_N$, and exhibits the slope established by the offset-adjusted gradient signal.

From equation (3), it is seen that the summed signal $C'_N$, sulplied to integrator 30, includes a component which, itself, is an integral. When this component is, in turn, integrated by integrator 30, a quadratic component is obtained therefrom. This quadratic component is included in the velocity error correction signal ΔJ, and is a good approximation of the non-linear jitter curve J shown in FIG. 4A. Thus, jitter in the Nth line interval of the video signal is compensated by modulating the phase of the read clock pulses which are used to read out this Nth line interval with a velocity error correction signal having a quadratic component. In particular, this velkcity error correction signal ΔJ is produced by integrating the signal $C'_N$ represented by equation (3).

FIG. 4C is an illustration of the waveform of the velocity error correction signal ΔJ produced for each line interval that is read out from the main memory. It is seen that this velocity error correction signal is reset to zero at the beginning of each line interval and, moreover, is a close approximation of the actual jitter which is present during each line interval of the video signal. FIG. 4C is compared with FIG. 2C wherein the velocity error correction signal is a linear approximation of the jitter. In FIG. 4C, the velocity error correction signal is a non-linear approximation, which closely resembles, the jitter. Hence, residual velocity errors in the video signals read out from main memory 3 are substantially removed.

Another embodiment of velocity error correction signal generator 11 is illustrated in FIG. 5 as comprising a difference circuit 32, an integrator 33, an attenuator 34 and a combining circuit 35. Difference circuit 32 may be similar to aforedescribed difference circuits 21 and 22, and is coupled to input terminals 20a and 20c. Thus, difference circuit 32 is supplied with velocity error signal $C_{N-1}$, associated with the preceding line of video signals, which is subtracted from velocity error signal $C_{N+1}$, associated with the next-following line kf video signals. The difference signal $C_{N+1} - C_{N-1}$ produced by difference circuit 32 is supplied to integrator 33 and, additionally, to attenuator 34.

Integrator 33 functions to integrate the difference signal, resulting in the gradient signal expressed by equation (1) above. Attenuator 34 functions to attenuate the difference signal by the predetermined factor one-half, resulting in the attenuated difference signal represented by equation (2) above.

Combining circuit 34 functions to algebraically sum the integrated difference signal supplied thereto by integrator 33 and the velocity error signal $C_N$ supplied to input terminal 20b and associated with the line of video signals then read out from main memory 3. Combining circuit 34 further serves to subtract the attenuated difference signal, supplied thereto by attenuator 34, from these summed signals, resulting in the velocity error voltage $C'_N$ represented by equation (3) above. As one example, combining circuit 35 may comprise an algebraic adder for adding the output of integrator 33 to the velocity error signal applied to input terminal 20b, the output of this algebraic adder being supplied to a subtractor in which the output of attenuator 34 is subtracted. As an alternative, combining circuit 35 may comprise a summing circuit, similar to summing circuit 29, and attenuator 34 may exhibit a gain of $-\frac{1}{2}$, or the output of attenuator 34 may be supplied through an inverter. In either embodiment, combining circuit 35 supplies integrator 30 with the velocity error signal $C'_N$ represented by equation (3). As in the embodiment of FIG. 4, integrator 30 supplies phase modulator 8 with the velocity error correction signal ΔJ.

Thus, in accordance with the present invention, when a particular line of video signals is read out from main memory 3, the velocity error signal associated with that line, as well as at least the velocity error signals associated with the preceding and next-following lines, are simultaneously read out of velocity error memory 12. The gradient between the velocity errors associated with the preceding and next-following lines is obtained, and this gradient is adjusted by an offset equal to one-half the difference between such velocity errors. Then, the offset-adjusted gradient is summed with the velocity error associated with the line of video signals the read out from the main memkry; and the summed signals are integrated to produce a velocity error correction signal that varies with time in a non-linear manner. More particularly, this velocity error correction signal is a close approximation of the actual velocity error that is present in each line interval. Since the read-out clock pulses for the main memory are phase-modulated by this velocity error correction signal, the video signals which are read out from the main memory exhibit little, if any, time base fluctuations. Hence, the video signals are substantially free of undesired time base jitter.

While the present invention has been particularly shown and described with reference to certain preferred embodiments, it should be readily apparent to those of ordinary skill in the art that various changes and modifications in form and details may be made without departing from the spirit and scope of the invention. The various difference circuits, subtracting circuits, integrators and attenuators described hereinabove with respect to FIGS. 3 and 5 may be of conventional construction. If desired, alternative circuits capable of performing similar functions may be used. For example, in place of a subtracting circuit, an adder may be provided, and one of the signals supplied to that adder may be inverted, thereby effecting a subtracting operation.

It is intended that the appended claims be interpreted as including the foregoing as well as various other changes and modifications.

What is claimed is:

1. A velocity error compensator for use in a time base corrector of the type which corrects time base errors in periodic information signals having a main memory for storing plural periods of said information signals, write-in means for writing individual periods of said information signals into said main memory at a rate synchronized with said periodic information signals, and read-out means for reading out said individual periods of said information signals from said main memory at a reference read-out rate, said velocity error compensator comprising velocity error detecting means for detecting a velocity error in each period of said information signals and for producing a velocity error signal representative thereof; velocity error storage means for storing the velocity error signals associated with a plurality of said periods of information signals; velocity error read-out means for reading out from said velocity error storage means simultaneously the velocity error signal associated with the period of information signals then read out from said main memory and the velocity error signals associated with at lest the preceding and next-following periods of information signals read out from said main memory; combining means for combining the simultaneously read out velocity error signals to produce a velocity error-correction signal as a function of the simultaneously read out velocity error signals, said combining means including means for producing a gradient signal representing the gradient between the velocity error signals associated with said preceding and next-following periods of information signals, means for adjusting an offset in said gradient signal, means for summing the offset-adjusted gradient signal and said velocity error signal associated with the period of information signals then read out from said main memory and means for integrating the summed signals to produce said velocity rror-correction signal; and means for modulating said reference read-out rate in accordance with said velocity error-correction signal.

2. The velocity error compensator of claim 1 wherein said information signals are video signals, and said periods are the horizontal line intervals of said video signals.

3. The velocity error compensator of claim 2 wherein said video signals are color television signals including a burst signal; and said velocity error comprises the phase difference between the burst signals included in two successive horizontal line intervals.

4. The velocity error compensator of claim 1, wherein said means for producing a gradient signal comprises integrator means for integrating the difference between said velocity error signals associated with said preceding and next-following period of information signals to produce an integrated signal.

5. The velocity error compensator of claim 4 wherein said means for adjusting an offset in said gradient signal comprises means for producing a difference signal representing one-half the difference between said velocity error signals associated with said preceding and next-following periods of information, and means for subtracting said difference signal from said integrated signal.

6. The velocity error compensator of claim 5 wherein said means for subtracting comprises arithmetic means for additionally adding said velocity error signal associated with the period of information signals then read out from said main memory to the difference between said integrated signal and said difference signal.

7. The velocity error compensator of claim 6, further comprising a subtractor supplied with the velocity error signals associated with said preceding and next-following periods of information signals, respectively, to obtain the difference therebetween, said subtractor having an output coupled to said integrator means.

8. The velocity error compensator of claim 7, wherein said means for producing a difference signal representing one-half the difference between said velocity error signals associated with said preceding and next-following periods of information comprises said subtractor and an attenuator coupled to said output of said subtractor and having an attenuation factor of one-half.

9. The velocity error compensator of claim 1 wherein said means for producing a gradient signal comprises first integrator means for integrating the difference between said velocity error signals associated with the period of information signals then read out from said main memory and said preceding period of information signals to produce a first integrated signal; second integrator means for integrating the difference between said velocity error signals associated with said next-following period of information signals and said period of information signals then read out from said main memory to produce a second integrated signal; and means for adding said first and second integrated signals.

10. The velocity error compensator of claim 9 wherein said means for adjusting an offset in said gradient signal comprises first means for producing a first difference signal representing one-half the difference between said velocity error signals associated with said period of information signals then read out from said main memory and said preceding period of information signals; second means for producing a second difference signal representing one-half the difference between the velocity error signals associated with said next-following period of information signals and said period of information signals then read out from said main memory; means for subtracting said first difference signal from said first integrated signal; and means for subtracting said second difference signal from said second integrated signal; the outputs of both of said means for subtracting being added.

11. The velocity error compensator of claim 10 wherein said first means for producing a first difference signal comprises first differencing means supplied with said velocity error signals associated with said period of information signals then read out from said main memory and with said preceding period of information signals, and a first attenuator having an attenuation factor of one-half coupled to an output of said first differencing means; and said second means for producing a second difference signal comprises second differencing means supplied with said velocity error signals associated with said next-following period of information signals and with said period of information signals then read out from said main memory, and a second attenuator having a attenuation factor of one-half coupled to an output of said second differencing means.

12. The velocity error compensator of claim 11 wherein said outputs of said first and second differencing means are further coupled to said first and second integrator means, respectively.

13. A velocity error compensator for use in a time base corrector of the type adapted to correct time base errors in successive horizontal line intervals of a video signal having a main memory for storing plural lines of said video signals, write-in means for writing individual lines of said video signals into said main memory at a write-in rate synchronized with said video signals, and read-out means for reading out said individual lines of said video signals from said main memory at a reference read-out rate, said velocity error compensator comprising velocity error detecting means for detecting velocity errors in respective lines of said video signals and for producing velocity error signals representative thereof; velocity error storage means for storing the velocity error signals associated with a plurality of said lines of video signals; velocity rror read-out means for reading out from said velocity error storage means simultaneously the velocity error signals associated with the line of video signals then read out from said main memory and the preceding and next-following lines of video information read out from said main memory; gradient signal generating means for generating a gradient signal representing the gradient between the velocity error signals associated with said preceding and next-following lines of video signals; summing means for summing said gradient signal and said velocity error signal associated with said line of video signals then read out from said main memory to produce a velocity error correction signal; integrating means for integrating said velocity error correction signal; and means for modulating said reference read-out rate in accordance with the integrated velocity error correction signal.

14. The velocity error compensator of claim 13, wherein said gradient signal generating means comprises first difference means for producing a first difference signal as a function of the difference between the velocity error signals associated with said line of video signals then read out from said main memory and said preceding line; second difference means for producing a second difference signal as a function of the difference between the velocity error signals associated with said next-following line of video signals read out from said main memory and said line of video signals then read out therefrom; and first and second integrators for integrating said first and second difference signals, respectively, the integrated difference signals being supplied to said summing means.

15. The velocity error compensator of claim 14, further comprising first and second attenuating means for attenuating said first and second difference signals, respectively, by a predetermined factor; means for subtracting the attenuated first difference signal from the integrated first difference signal before supplying the latter to said summing means; and means for subtracting the attenuated second difference signal from the integrated second difference signal before supplying the latter to said summing means.

16. The velocity error compensator of claim 13 wherei said gradient signal generating means comprises difference means for producing a difference signal as a function of the difference between the velocity error signals associated with said next-following and said preceding lines of video signals read out from said main memory; and an integrator for integrating said difference signal, the integrated difference signal being supplied to said summing means.

17. The velocity error compensator of claim 16, further comprising attenuating means for attenuating said difference signal by a predetermined factor; and means for subtracting said attenuated difference signal from the integrated difference signal before supplying the latter to said summing means.

* * * * *